(12) United States Patent
Takahashi

(10) Patent No.: US 10,733,717 B2
(45) Date of Patent: Aug. 4, 2020

(54) MEASUREMENT DEVICE AND METHOD FOR OPERATING THE SAME

(71) Applicant: OLYMPUS CORPORATION, Tokyo (JP)

(72) Inventor: Hideaki Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 124 days.

(21) Appl. No.: 16/021,079

(22) Filed: Jun. 28, 2018

(65) Prior Publication Data

US 2019/0026883 A1 Jan. 24, 2019

(30) Foreign Application Priority Data

Jul. 19, 2017 (JP) ................................ 2017-140233

(51) Int. Cl.
| | |
|---|---|
| *G06T 7/00* | (2017.01) |
| *G06T 7/70* | (2017.01) |
| *H04N 13/207* | (2018.01) |
| *G06T 7/285* | (2017.01) |
| *H04N 5/30* | (2006.01) |
| *H04N 13/211* | (2018.01) |
| *G03B 9/08* | (2006.01) |
| *G03B 35/02* | (2006.01) |
| *H04N 13/00* | (2018.01) |

(52) U.S. Cl.
CPC .............. *G06T 7/0002* (2013.01); *G03B 9/08* (2013.01); *G03B 35/02* (2013.01); *G06T 7/285* (2017.01); *G06T 7/70* (2017.01); *G06T 7/97* (2017.01); *H04N 5/30* (2013.01); *H04N 13/207* (2018.05); *H04N 13/211* (2018.05); *G06T 2207/10068* (2013.01); *H04N 2013/0074* (2013.01); *H04N 2213/001* (2013.01)

(58) Field of Classification Search
None
See application file for complete search history.

(56) References Cited

U.S. PATENT DOCUMENTS

| | | | | |
|---|---|---|---|---|
| 2013/0114887 | A1* | 5/2013 | Nanri | G01C 3/085 382/154 |
| 2014/0320704 | A1* | 10/2014 | Shuda | H04N 5/23212 348/241 |

(Continued)

FOREIGN PATENT DOCUMENTS

| | | |
|---|---|---|
| JP | 2004-049638 A | 2/2004 |
| JP | 2010-128354 A | 6/2010 |
| JP | 2016-014896 A | 1/2016 |

*Primary Examiner* — Fayyaz Alam
(74) *Attorney, Agent, or Firm* — Scully, Scott, Murphy & Presser, P.C.

(57) ABSTRACT

In a measurement device, a controller causes an imaging unit to generate a plurality of first pictures based on a first image and a plurality of second pictures based on a second image. The controller determines whether or not there is blurring on the basis of at least two of the plurality of first pictures. The controller determines whether or not there is blurring on the basis of at least two of the plurality of second pictures. The controller causes a measurement unit to perform measurement when the controller determines that there is no blurring in first picture blurring determination and second picture blurring determination.

5 Claims, 9 Drawing Sheets

(56) References Cited

U.S. PATENT DOCUMENTS

| | | | | |
|---|---|---|---|---|
| 2014/0333802 A1* | 11/2014 | Arai | ............ | H04N 5/3572 |
| | | | | 348/239 |
| 2015/0043783 A1* | 2/2015 | Ishihara | ............ | G06T 7/571 |
| | | | | 382/106 |
| 2015/0305600 A1* | 10/2015 | Minamizato | ............ | A61B 1/307 |
| | | | | 600/111 |
| 2016/0275657 A1* | 9/2016 | Ezawa | ............ | G06T 5/20 |
| 2016/0321819 A1* | 11/2016 | Morgan-Mar | ............ | G06T 7/262 |
| 2019/0104921 A1* | 4/2019 | Yamamoto | ............ | A61B 1/04 |

* cited by examiner

MEASUREMENT DEVICE AND METHOD FOR OPERATING THE SAME

BACKGROUND OF THE INVENTION

Field of the Invention

The present invention relates to a measurement device and a method for operating the same.

Priority is claimed on Japanese Patent Application No. 2017-140233, filed on Jul. 19, 2017, the content of which is incorporated herein by reference.

Description of Related Art

Industrial endoscopes are widely used for nondestructively performing visual inspection for internal scratches and corrosion of engines, turbines, chemical plants, and the like. When defects such as scratches and corrosion are found, it is necessary to perform switching between countermeasure methods according to a degree thereof. Thus, there is an industrial endoscope having a measurement function of measuring the scale of scratches and corrosion.

For example, as shown in Japanese Unexamined Patent Application, First Publication No. 2004-49638, a measurement endoscope device includes two optical systems having parallax. The measurement endoscope device simultaneously captures optical images obtained by the optical systems. The measurement endoscope device calculates three-dimensional coordinates of a subject and a size of the subject on the basis of the principle of stereo measurement using the two generated pictures.

A stereo measurement device disclosed in Japanese Unexamined Patent Application, First Publication No. 2010-128354 includes an optical system configured to form two images of a subject formed by light passing through two different optical paths (referred to as a first optical path and a second optical path) in a common area of an image sensor. Also, the stereo measurement device includes an optical path switching means for performing switching between the optical paths so that a subject image formed only by light passing through one of the two optical paths is captured.

When a subject is measured using the stereo measurement device disclosed in Japanese Unexamined Patent Application, First Publication No. 2010-128354, a picture (referred to as a first picture) is generated through imaging based on a first subject image formed by light passing through the first optical path. Subsequently, the optical path is switched and a picture (referred to as a second picture) is generated through imaging based on a second subject image formed by light passing through the second optical path. On the basis of parallaxes of the first picture and the second picture, a shape of the subject is measured using the principle of stereo measurement.

In a measurement endoscope device disclosed in Japanese Unexamined Patent Application, First Publication No. 2004-49638, two subject images formed by light passing through two optical paths are formed in different areas of an image sensor. On the other hand, in a stereo measurement device disclosed in Japanese Unexamined Patent Application, First Publication No. 2010-128354, two subject images formed by light passing through two optical paths are formed in a common area of an image sensor. Thus, in the stereo measurement device disclosed in Japanese Unexamined Patent Application, First Publication No. 2010-128354, it is possible to increase an imaging area and improve imaging quality.

On the other hand, according to a technique of Japanese Unexamined Patent Application, First Publication No. 2010-128354, an error may occur in parameters (a baseline length and the like) of stereo measurement due to movement of an endoscope while a first picture and a second picture are captured. Thus, it is not possible to accurately measure a shape of a subject. A technique for solving this problem is disclosed in Japanese Unexamined Patent Application, First Publication No. 2016-14896.

An endoscope device disclosed in Japanese Unexamined Patent Application, First Publication No. 2016-14896 alternately captures a first picture and a second picture. When the amount of displacement between two first pictures or between two second pictures is less than a predetermined threshold value, the endoscope device determines that there is no motion in the device and performs a measurement process.

The endoscope device disclosed in Japanese Unexamined Patent Application, First Publication No. 2016-14896 consecutively captures first pictures and determines that it is possible to perform measurement when the amount of blurring between a plurality of first pictures is equal to or less than a predetermined threshold value. At this time, the endoscope device captures a second picture and performs measurement using the first and second pictures. In this determination, only the amount of blurring between the first pictures is used, and the amount of blurring at the timing at which the second picture is captured is not taken into consideration.

The influence of blurring upon measurement will be described below with reference to FIGS. 9A and 9B. FIGS. 9A and 9B show the amount of blurring at the timing of capturing a picture.

Motion of an image sensor in a virtual XY plane that coincides with an imaging surface of the image sensor is schematically shown. R pictures are acquired in an N−2th frame, an N−1th frame, an Nth frame, an N+2th frame, and an N+3th frame. An L picture is acquired in an N+1th frame. The R pictures are right pictures used for stereo measurement. The L picture is a left picture used for stereo measurement. The following description will be given with reference to the case in which the R pictures are first pictures and the L pictures are second pictures. Alternatively, the R pictures may be second pictures and the L pictures may be first pictures.

The amount of blurring of each picture with reference to the first picture of the Nth frame is shown in FIGS. 9A and 9B. In the example shown in FIG. 9A, the amount of blurring of the picture of each frame is smaller than a predetermined threshold value TH1. Therefore, when the first picture of the Nth frame is acquired, the endoscope device determines that the amount of blurring is smaller than the threshold value TH1 and performs stereo measurement. The first picture of the Nth frame and the second picture of the N+1th frame are used in the stereo measurement. The endoscope device can obtain a desired measurement result since the amount of blurring of the second picture of the N+1th frame is smaller than the threshold value TH1.

Also in the example shown in FIG. 9B, the amount of blurring of the first pictures of the N−2th frame, the N−1th frame, and the Nth frame is smaller than the predetermined threshold value TH1. Therefore, the endoscope device performs stereo measurement using the first picture of the Nth frame and the second picture of the N+1th frame. However, in the example shown in FIG. 9B, great blurring that exceeds the threshold value TH1 occurs in the second picture of the N+1th frame.

SUMMARY OF THE INVENTION

According to a first aspect of the present invention, a measurement device includes an imaging unit, an optical path setting unit, a measurement unit, and a controller. The imaging unit includes an imaging area on which a first image of a subject formed by light transmitted through a first optical path and a second image of the subject formed by light transmitted through a second optical path different from the first optical path are commonly formed. The imaging unit is configured to capture the first and second images. The imaging unit is configured to generate a first picture based on the first image and a second picture based on the second image. The optical path setting unit is configured to set one of the first and second optical paths as an optical path for imaging such that only one of the first and second images is formed on the imaging area. The measurement unit is configured to measure at least one of a shape of the subject and a distance to the subject on the basis of the first and second pictures. The controller is configured to control the imaging unit, the optical path setting unit, and the measurement unit. The controller is configured to perform optical path setting control to cause the optical path setting unit to set one of the first optical path and the second optical path as the optical path for imaging. The controller is configured to perform first picture generation control to cause the imaging unit to capture the first image in a state in which the first optical path is set as the optical path for imaging and to generate a plurality of first pictures based on the first image. The controller is configured to perform second picture generation control to cause the imaging unit to capture the second image in a state in which the second optical path is set as the optical path for imaging and to generate a plurality of second pictures based on the second image. The controller is configured to perform first picture blurring determination to determine whether or not there is blurring on the basis of at least two of the plurality of first pictures. The controller is configured to perform second picture blurring determination to determine whether or not there is blurring on the basis of at least two of the plurality of second pictures. The controller is configured to perform measurement control to cause the measurement unit to perform measurement of at least one of the shape and the distance when the controller determines that there is no blurring in the first picture blurring determination and the second picture blurring determination.

According to a second aspect of the present invention, in the first aspect, the controller may be configured to perform the optical path setting control to cause the optical path setting unit to set the first optical path and then to set the second optical path. The controller may be configured to perform the second picture generation control to cause the imaging unit to generate a plurality of consecutive second pictures after the second optical path is set. The controller may be configured to perform the second picture blurring determination to determine whether or not there is the blurring on the basis of two or more consecutive second pictures among the plurality of consecutive second pictures.

According to a third aspect of the present invention, in the first aspect, the controller may be configured to perform the optical path setting control to cause the optical path setting unit to alternately set the first optical path and the second optical path. The controller may be configured to perform, when the second optical path is set before the first optical path is set, the second picture generation control to cause the imaging unit to generate a first group including the plurality of second pictures. The controller may be configured to perform, when the first optical path is set after the second optical path is set, the first picture generation control to cause the imaging unit to generate the first picture. The controller may be configured to perform, when the second optical path is set after the first optical path is set, the second picture generation control to cause the imaging unit to generate a second group including the plurality of second pictures. The controller may be configured to perform the second picture blurring determination to determine whether or not there is the blurring on the basis of at least one of the second pictures included in the first group and at least one of the second pictures included in the second group.

According to a fourth aspect of the present invention, in the first aspect, the first picture blurring determination and the second picture blurring determination may be performed after the first picture generation control and the second picture generation control.

According to a fifth aspect of the present invention, a method for operating a measurement device includes a first picture generation step, a second picture generation step, a first picture blurring determination step, a second picture blurring determination step, and a measurement step. The measurement device includes an imaging unit, optical path setting unit, a measurement unit, and a controller. The imaging unit includes an imaging area on which a first image of a subject formed by light transmitted through a first optical path and a second image of the subject formed by light transmitted through a second optical path different from the first optical path are commonly formed. The imaging unit is configured to capture the first and second images and to generate a first picture based on the first image and a second picture based on the second image. The optical path setting unit is configured to set one of the first and second optical paths as an optical path for imaging such that only one of the first and second images is formed on the imaging area. The measurement unit is configured to measure at least one of a shape of the subject and a distance to the subject on the basis of the first and second pictures. The controller is configured to control the imaging unit, the optical path setting unit, and the measurement unit. In the first picture generation step, the controller causes the imaging unit to capture the first image in a state in which the first optical path is set as the optical path for imaging and to generate a plurality of first pictures based on the first image. In the second picture generation step, the controller causes the imaging unit to capture the second image in a state in which the second optical path is set as the optical path for imaging and to generate a plurality of second pictures based on the second image. In the first picture blurring determination step, the controller determines whether or not there is blurring on the basis of at least two of the plurality of first pictures. In the second picture blurring determination step, the controller determines whether or not there is blurring on the basis of at least two of the plurality of second pictures. In the measurement step, the controller causes the measurement unit to perform measurement of at least one of the shape and the distance when the controller determines that there is no blurring in the first picture blurring determination step and the second picture blurring determination step.

According to a sixth aspect of the present invention, a method for operating a measurement device includes a first picture generation step, a second picture generation step, a measurement step, a first picture blurring determination step, a second picture blurring determination step, and a validity determination step. The measurement device includes an imaging unit, an optical path setting unit, a measurement unit, and a controller. The imaging unit includes an imaging area on which a first image of a subject formed by light transmitted through a first optical path and a second image of the subject formed by light transmitted through a second optical path different from the first optical path are commonly formed. The imaging unit is configured to capture the first and second images and to generate a first picture based on the first image and a second picture based on the second image. The optical path setting unit is configured to set one of the first and second optical paths as an optical path for imaging such that only one of the first and second images is formed on the imaging area. The measurement unit is configured to measure at least one of a shape of the subject and a distance to the subject on the basis of the first and second pictures. The controller is configured to control the imaging unit, the optical path setting unit, and the measurement unit. In the first picture generation step, the controller causes the imaging unit to capture the first image in a state in which the first optical path is set as the optical path for imaging and to generate a plurality of first pictures based on the first image. In the second picture generation step, the controller causes the imaging unit to capture the second image in a state in which the second optical path is set as the optical path for imaging and to generate a plurality of second pictures based on the second image. In the measurement step, the controller causes the measurement unit to perform measurement of at least one of the shape and the distance on the basis of both at least one first picture among the plurality of first pictures and at least one second picture among the plurality of second pictures. In the first picture blurring determination step, the controller determines whether or not there is blurring on the basis of both the first picture used in the measurement step and the first picture other than the first picture used in the measurement step among the plurality of first pictures. In the second picture blurring determination step, the controller determines whether or not there is blurring on the basis of both the second picture used in the measurement step and the second picture other than the second picture used in the measurement step among the plurality of second pictures. In the validity determination step, the controller determines that a measurement result obtained through the measurement performed by the measurement unit is valid when the controller determines that there is no blurring in the first picture blurring determination step and the second picture blurring determination step.

DETAILED DESCRIPTION OF THE INVENTION

Hereinafter, embodiments of the present invention will be described with reference to the drawings.

First Embodiment

Figure 1:
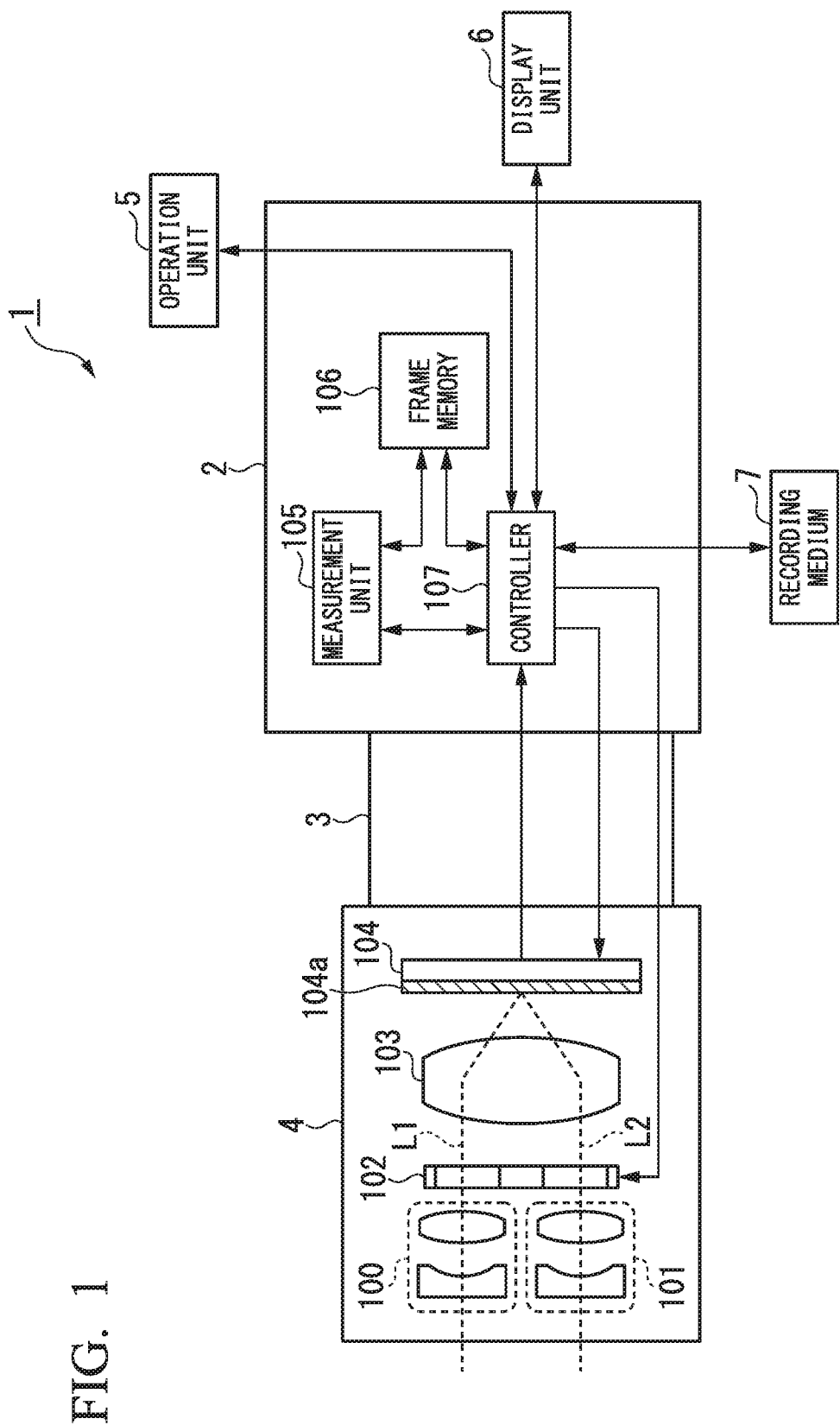
FIG. 1 is a block diagram showing a configuration of a measurement device according to a first embodiment of the present invention.

FIG. 1 shows a configuration of a measurement device 1 according to a first embodiment of the present invention. An example in which the measurement device 1 is an endoscope device will be described below. As shown in FIG. 1, the measurement device 1 includes a control unit 2, an insertion portion 3, a distal end unit 4, an operation unit 5, a display unit 6, and a recording medium 7.

The insertion portion 3 is inserted into an object to be measured. The distal end unit 4 is arranged at a distal end of the insertion portion 3. The distal end unit 4 includes a first optical system 100, a second optical system 101, an optical path setting unit 102, an imaging optical system 103, and an image sensor 104 (imaging unit).

For example, each of the first optical system 100 and the second optical system 101 has an objective lens which is a combination of a concave lens and a convex lens. The second optical system 101 is disposed so as to have a parallax with respect to the first optical system 100. That is, the first optical system 100 and the second optical system 101 are separated in a parallax direction. The parallax direction is the direction of a straight line that passes through the optical center (principal point) of the first optical system 100 and the optical center (principal point) of the second optical system 101. Light incident on the first optical system 100 passes through a first optical path L1. Light incident on the second optical system 101 passes through a second optical path L2 different from the first optical path L1. The first optical system 100 forms a first image of a subject and the second optical system 101 forms a second image of the subject.

The optical path setting unit 102 switches the optical path between the first optical path L1 and the second optical path L2 such that only one of the first image and the second image is formed on an imaging area 104a of the image sensor 104. That is, the optical path setting unit 102 sets one of the first optical path L1 and the second optical path L2 as the optical path for imaging such that only one of the first image and the second image is formed on the imaging area 104a of the image sensor 104. The optical path setting unit 102 is configured to transmit only light passing through one of the first optical path L1 and the second optical path L2 and to shield light passing through the other.

For example, the optical path setting unit 102 includes a light shielding plate that is inserted into only one of the first optical path L1 and the second optical path L2. When the optical path setting unit 102 transmits light of the first optical path L1, the light shielding plate is inserted into the second optical path L2 and light of the second optical path L2 is shielded. When the optical path setting unit 102 transmits light of the second optical path L2, the light shielding plate is inserted into the first optical path L1 and light of the first optical path L1 is shielded. The optical path switching operation of the optical path setting unit 102 is controlled by a control signal from a controller 107 in the control unit 2. The imaging optical system 103 forms a subject image based on one of light transmitted through the first optical path L1 and light transmitted through the second optical path L2 on the imaging area 104a of the image sensor 104. A subject image based on light transmitted through only an optical path which is set as the optical path for imaging among the first optical path L1 and the second optical path L2 is formed on the imaging area 104a of the image sensor 104.

The image sensor 104 has the imaging area 104a on which a first image of the subject formed by light transmitted through the first optical path L1 and a second image of the subject formed by light transmitted through the second optical path L2 different from the first optical path L1 are commonly formed. The image sensor 104 captures the first image and the second image. The image sensor 104 captures the first image at a first imaging timing via the first optical system 100. The image sensor 104 captures the second image at a second imaging timing different from the first imaging timing via the second optical system 101. The image sensor 104 generates a first picture based on the first image formed on the imaging area 104a and a second picture based on the second image formed on the imaging area 104a. The image sensor 104 captures the first image at a plurality of different first imaging timings and generates a plurality of first pictures. The image sensor 104 captures the second image at a plurality of different second imaging timings and generates a plurality of second pictures. The image sensor 104 outputs the first and second pictures to the controller 107. The operation of the image sensor 104 is controlled by a control signal from the controller 107.

The control unit 2 is connected to the insertion portion 3. The control unit 2 includes a measurement unit 105, a frame memory 106, and the controller 107. In FIG. 1, light sources and the like are omitted.

The measurement unit 105 measures at least one of the shape of the subject and the distance to the subject (subject distance) on the basis of the first and second pictures. For example, the shape of the subject include the distance between arbitrary two points on the subject, the area of a area defined by three or more points on the subject, and the like. The subject distance is the distance from the distal end unit 4 where the image sensor 104 is disposed to the subject. The measurement unit 105 performs stereo measurement by triangulation using the parallax of the two pictures. This allows the measurement unit 105 to calculate three-dimensional coordinates of at least one point on the surface of the subject.

The frame memory 106 stores the first and second pictures generated by the image sensor 104. The frame memory 106 is configured as a volatile or nonvolatile memory. For example, the frame memory 106 may be at least one of a random access memory (RAM), a dynamic random access memory (DRAM), a static random access memory (SRAM), an erasable programmable read only memory (EPROM), an electrically erasable programmable read-only memory (EEPROM), and a flash memory. The measurement device 1 may have a hard disk drive to store the first and second pictures.

The controller 107 controls the optical path setting unit 102, the image sensor 104, and the measurement unit 105. In addition to these, the controller 107 also controls the operation unit 5 and the display unit 6. The controller 107 performs optical path setting control, first picture generation control, second picture generation control, first picture blurring determination, second picture blurring determination, and measurement control. By performing the optical path setting control, the controller 107 causes the optical path setting unit 102 to set one of the first optical path L1 and the second optical path L2 as the optical path for imaging. By performing the first picture generation control, the controller 107 causes the image sensor 104 to capture the first image in a state in which the first optical path L1 is set as the optical path for imaging and to generate a plurality of first pictures based on the first image. By performing the second picture generation control, the controller 107 causes the image sensor 104 to capture the second image in a state in which the second optical path L2 is set as the optical path for imaging and to generate a plurality of second pictures based on the second image. By performing the first picture blurring determination, the controller 107 determines whether or not there is blurring on the basis of at least two of the plurality of first pictures generated by the first picture generation control. By performing the second picture blurring determination, the controller 107 determines whether or not there is blurring on the basis of at least two of the plurality of second pictures generated by the second picture generation control. By performing the measurement control, the controller 107 causes the measurement unit 105 to perform measurement when the controller determines that there is no blurring in the first picture blurring determination and the second picture blurring determination.

The measurement unit 105 and the controller 107 may be configured using at least one of a processor and a logic circuit. For example, the processor is at least one of a central processing unit (CPU), a digital signal processor (DSP), and a graphics processing unit (GPU). For example, the logic circuit is at least one of an application specific integrated circuit (ASIC) and a field-programmable gate array (FPGA). The measurement unit 105 and the controller 107 may include one or more processors. The measurement unit 105 and the controller 107 may include one or more logic circuits.

A computer of the measurement device 1 may read and execute a program including instructions defining operations of the measurement unit 105 and the controller 107. That is, the functions of the measurement unit 105 and the controller 107 may be realized by software. This program may be provided by a "computer-readable recording medium" such as a flash memory. The program may also be transmitted from a computer having a storage device or the like in which the program is stored to the measurement device 1 via a transmission medium or by transmission waves in the transmission medium. The "transmission medium" for transmitting the program is a medium having a function of transmitting information such as a network (communication network) such as the Internet and a communication line (communication wire) such as a telephone line. The above-described program may realize a part of the above-described functions. The above-described program may also be a differential file (differential program) that can realize the above-described functions in combination with a program already recorded in the computer.

The operation unit 5 is a user interface that receives an instruction from the user. By operating the operation unit 5, the user inputs instructions necessary for controlling various operations of the entire measurement device 1. The operation unit 5 outputs a signal indicating an instruction received from the user to the controller 107. For example, the operation unit 5 is at least one of a button, a switch, a key, a mouse, a joystick, a touch pad, a track ball, and a touch panel.

The display unit 6 displays at least one of the first and second pictures. The display unit 6 also displays operation control content, measurement results, and the like. For example, the operation control content is displayed as a menu. For example, the display unit 6 is at least one of a liquid crystal display and an organic electro-luminescence (EL) display. The display unit 6 may be a touch panel display. In this case, the operation unit 5 and the display unit 6 are integrated.

The recording medium 7 stores the first pictures, the second pictures, the measurement results, and the like. For example, the recording medium 7 is a nonvolatile recording medium such as a flash memory. The recording medium 7 may be attachable to and detachable from the control unit 2.

The operation unit 5, the display unit 6, and the recording medium 7 are not necessary in the measurement device 1.

Figure 2:
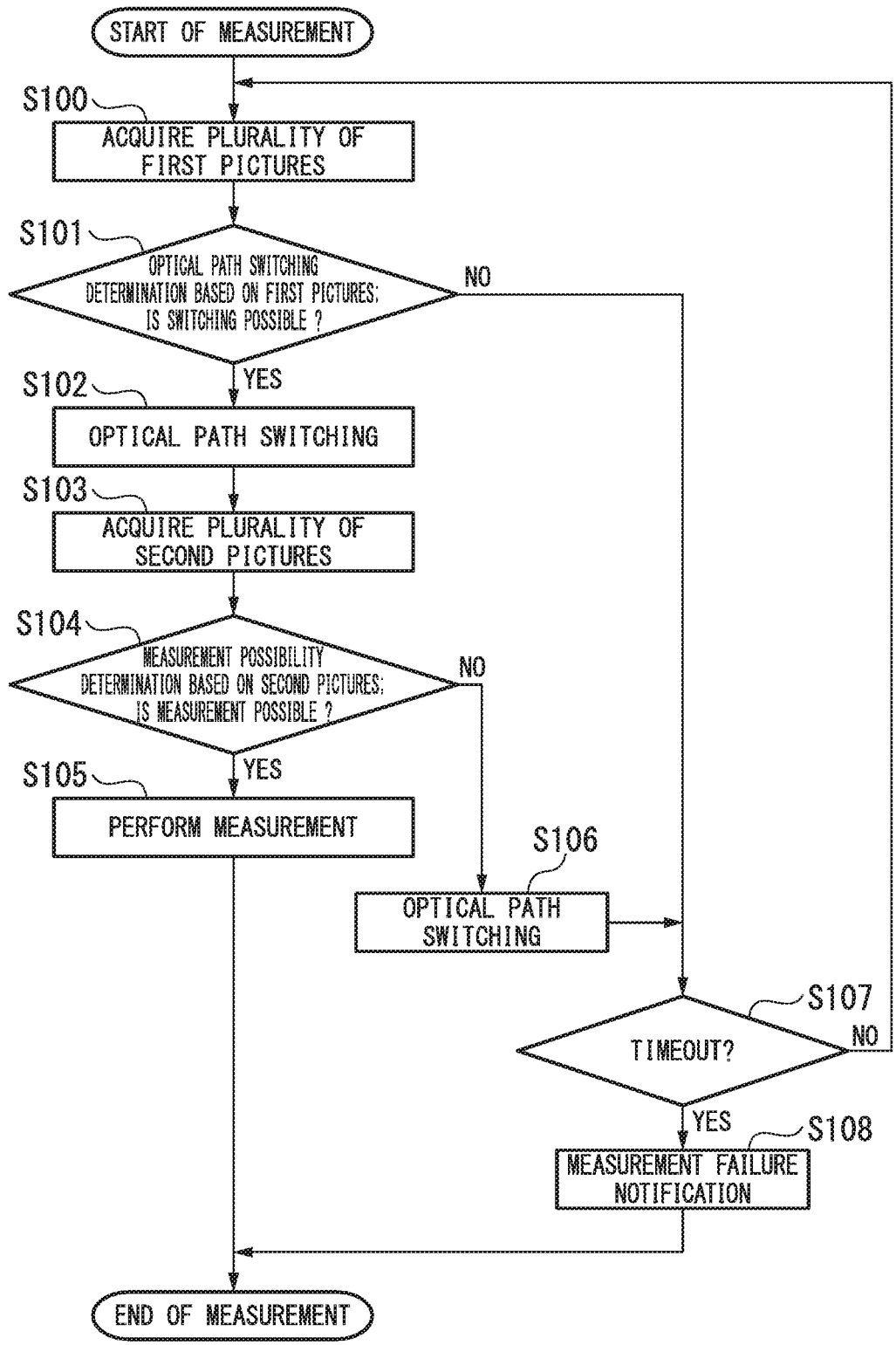
FIG. 2 is a flowchart showing a measurement procedure in the first embodiment of the present invention.

FIG. 2 shows a measurement procedure in the first embodiment. Details of the measurement in the first embodiment will be described below with reference to FIG. 2.

Measurement may sometimes be performed by finding a place where there is a defect such as a scratch during observation of a subject. In this case, a measurement instruction is input via the operation unit 5. The controller 107 starts a control operation on the basis of the measurement instruction.

Here, the first optical path L1 is set as the optical path for imaging. When the second optical path L2 has been set, the controller 107 instructs the optical path setting unit 102 to perform optical path switching to set the first optical path L1. Thus, the light shielding plate is removed from the first optical path L1 and then inserted into the second optical path L2. A first image of a subject based on light transmitted through the first optical system 100 is formed on the imaging area 104*a* of the image sensor 104.

The controller 107 instructs the image sensor 104 to capture a plurality of (for example, two) first pictures. The image sensor 104 continuously captures a first image a plurality of times and generates a plurality of first pictures based on the first images. The image sensor 104 sequentially outputs the plurality of first pictures to the controller 107. The controller 107 sequentially stores the plurality of first pictures output from the image sensor 104 in the frame memory 106. The controller 107 also sequentially outputs the plurality of first pictures output from the image sensor 104 to the display unit 6. The display unit 6 sequentially displays the plurality of first pictures (step S100).

After step S100, the controller 107 performs blurring detection on the basis of at least two consecutive first pictures among the plurality of first pictures stored in the frame memory 106. The amount of blurring between a plurality of pictures is calculated by template matching using a known index. For example, an index such as a sum of squared difference (SSD), a sum of absolute difference (SAD), a normalized cross correlation (NCC), or a zero means normalized cross correlation (ZNCC) can be used. The controller 107 compares the amount of blurring calculated from the first pictures with a predetermined threshold value to determine whether or not there is blurring. This allows the controller 107 to determine whether or not optical path switching is possible (step S101).

When the amount of blurring between the first pictures is smaller than the threshold value, the controller 107 determines that there is no blurring. In this case, the controller 107 determines that optical path switching is possible. When the amount of blurring between the first pictures is greater than the threshold value, the controller 107 determines that there is blurring. In this case, the controller 107 determines that optical path switching is not possible.

When the controller 107 determines in step S101 that there is blurring, that is, that optical path switching is not possible, a process of step S107 is performed. When the controller 107 determines in step S101 that there is no blurring, that is, that optical path switching is possible, the controller 107 instructs the optical path setting unit 102 to perform optical path switching to set the second optical path L2. Thus, the light shielding plate on the second optical path L2 is removed from the second optical path L2 and then inserted into the first optical path L1. A second image of the subject based on light transmitted through the second optical system 101 is formed on the imaging area 104*a* of the image sensor 104 (step S102).

The controller 107 instructs the image sensor 104 to capture a plurality of (for example, two) second pictures. The image sensor 104 continuously captures a second image a plurality of times and generates a plurality of second pictures based on the second images. The image sensor 104 sequentially outputs the plurality of second pictures to the controller 107. The controller 107 sequentially stores the plurality of second pictures output from the image sensor 104 in the frame memory 106. The controller 107 also outputs a first picture acquired last among the plurality of first pictures acquired in step S100 to the display unit 6. The display unit 6 displays the first picture (step S103). Displaying the first picture instead of a second picture having a parallax with respect to the first picture maintains visibility.

After step S103, the controller 107 performs blurring detection on the basis of at least two consecutive second pictures among the plurality of second pictures stored in the frame memory 106. The method of blurring detection is similar to that of step S101. The controller 107 compares the amount of blurring calculated from the second pictures with a predetermined threshold value to determine whether or not there is blurring. This allows the controller 107 to determine whether or not it is possible to perform measurement (step S104).

When the amount of blurring between the second pictures is smaller than the threshold value, the controller 107 determines that there is no blurring. In this case, the controller 107 determines that it is possible to perform measurement. When the amount of blurring between the second pictures is greater than the threshold value, the controller 107 determines that there is blurring. In this case, the controller 107 determines that it is not possible to perform measurement.

When the controller 107 determines in step S104 that there is no blurring, that is, that it is possible to perform measurement, the controller 107 instructs the measurement unit 105 to perform measurement. The measurement unit 105 performs measurement on the basis of the first and second pictures stored in the frame memory 106. The first picture used for the determination of step S101 and the second picture used for the determination of step S104 are used for measurement. The measurement unit 105 notifies the controller 107 of the measurement result. The controller 107 outputs the measurement result to the display unit 6. The display unit 6 displays the measurement result (step S105). When the process of step S105 has been performed, the measurement is terminated. At this time, the optical path may be switched to set the first optical path L1. In step S105, the first and second pictures used for measurement and the measurement result may be recorded on the recording medium 7.

When the controller 107 determines in step S104 that there is blurring, that is, that it is not possible to perform measurement, the controller 107 instructs the optical path setting unit 102 to perform optical path switching to set the first optical path L1. Thus, the light shielding plate on the first optical path L1 is removed from the first optical path L1 and then inserted into the second optical path L2. A first image of the subject based on light transmitted through the first optical system 100 is formed on the imaging area 104a of the image sensor 104 (step S106).

After step S106, the controller 107 determines whether or not the time elapsed from the start of measurement has exceeded a predetermined time (step S107). When the controller 107 determines in step S107 that the elapsed time has not exceeded the predetermined time, the process of step S100 is performed. When the controller 107 determines in step S107 that the elapsed time has exceeded the predetermined time, the controller 107 causes the display unit 6 to display a message indicating that measurement has failed (step S108). When the process of step S108 has been performed, the measurement is terminated.

In the measurement of the first embodiment, the controller 107 causes the optical path setting unit 102 to set the first optical path L1 and then to set the second optical path L2 by performing optical path setting control (step S102). By performing second picture generation control, the controller 107 causes the image sensor 104 to generate a plurality of consecutive second pictures after the second optical path L2 is set (step S103). By performing second picture blurring determination, the controller 107 determines whether or not there is blurring on the basis of two or more consecutive second pictures among the plurality of consecutive second pictures (step S104).

Figure 3:
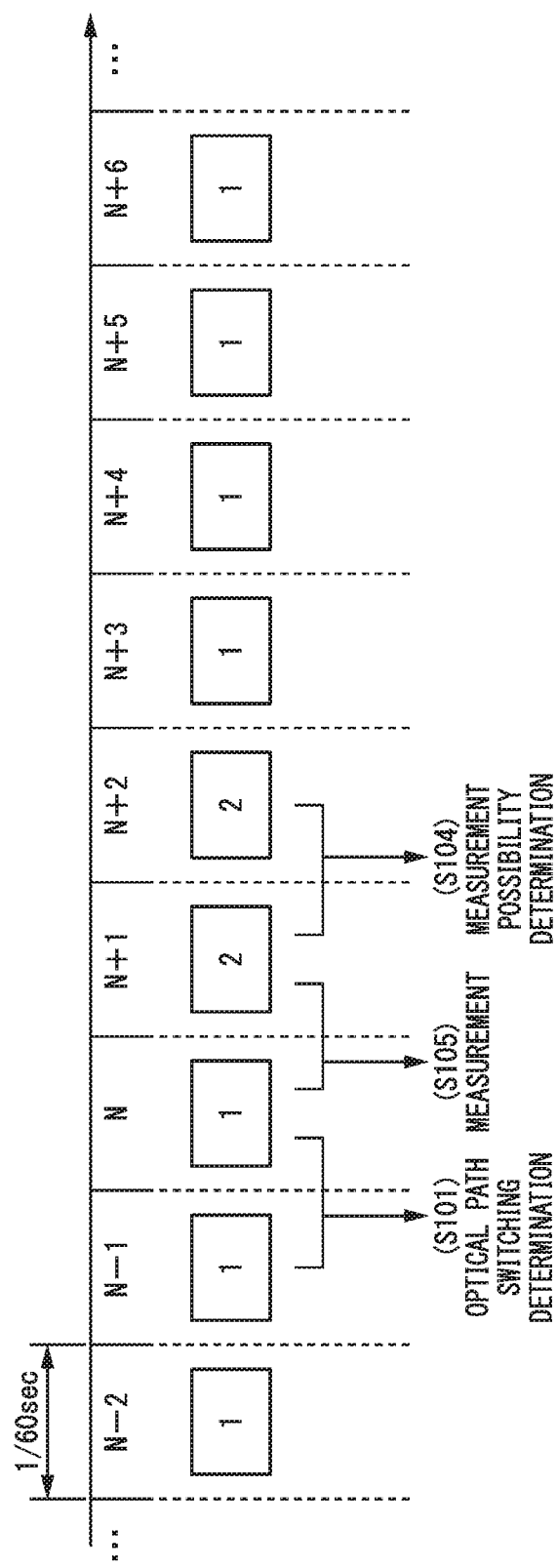
FIG. 3 is a timing chart showing a picture acquisition sequence in the first embodiment of the present invention.

FIG. 3 shows a picture acquisition sequence. Time advances to the right in FIG. 3. Pictures acquired from N−2th to N+6th frames are shown in FIG. 3. "1" shown in FIG. 3 represents first pictures and "2" represents second pictures.

First pictures are acquired from N−2th to Nth frames in a state in which the optical path for imaging is set to the first optical path L1 (step S100). The controller 107 performs blurring detection on the basis of the two first pictures of the N−1th and Nth frames and determines whether or not optical path switching is possible (step S101). When the controller 107 determines that optical path switching is possible, the optical path for imaging is switched from the first optical path L1 to the second optical path L2 (step S102).

Second pictures are acquired in the N+1 th and N+2th frames (step S103). The controller 107 performs blurring detection on the basis of the two second pictures of the N+1 th frame and N+2th frame and determines whether or not it is possible to perform measurement (step S104). When the controller 107 determines that it is possible to perform measurement, the measurement unit 105 performs measurement on the basis of the first picture of the Nth frame which is one of the pictures used for the optical path switching determination and the second picture of the N+1 th frame which is one of the pictures used for the measurement possibility determination (step S105). FIG. 3 shows how the optical path for imaging is again set to the first optical path L1 and first pictures of the N+3th and subsequent frames are acquired.

A combination of pictures used for measurement is not limited to those described above. Any one of the first pictures acquired in a state without blurring may be used for measurement. Therefore, instead of the first picture of the Nth frame, the first picture of the N−1th frame may be used for measurement. Any one of the second pictures acquired in a state without blurring may also be used for measurement. Therefore, instead of the second picture of the N+1 th frame, the second picture of the N+2th frame may be used for measurement.

In addition to the determination of step S104, the controller 107 may determine whether or not it is possible to perform measurement by determining whether or not there is blurring on the basis of two first pictures before and after the second pictures are acquired. That is, the controller 107 performs the determination using the first picture of the Nth frame and the first picture of the N+3th frame. When the controller 107 determines that it is possible to perform measurement in both the determination of step S104 and the determination based on the first pictures of the Nth and N+3th frames, measurement is performed.

As described above, measurement is performed when there is no blurring between the first pictures in step S101 and there is no blurring between the second pictures in step S104. This avoids the execution of measurement when great blurring has occurred at the timing of capturing second pictures although the amount of blurring between first pictures is small. Thus, the measurement device 1 can suppress degradation of measurement accuracy and avoid the risk of providing measurement results including errors to the user. As a result, the measurement device 1 can perform more reliable measurement.

Second Embodiment

A second embodiment of the present invention will be described using the measurement device 1 shown in FIG. 1.

Figure 4:
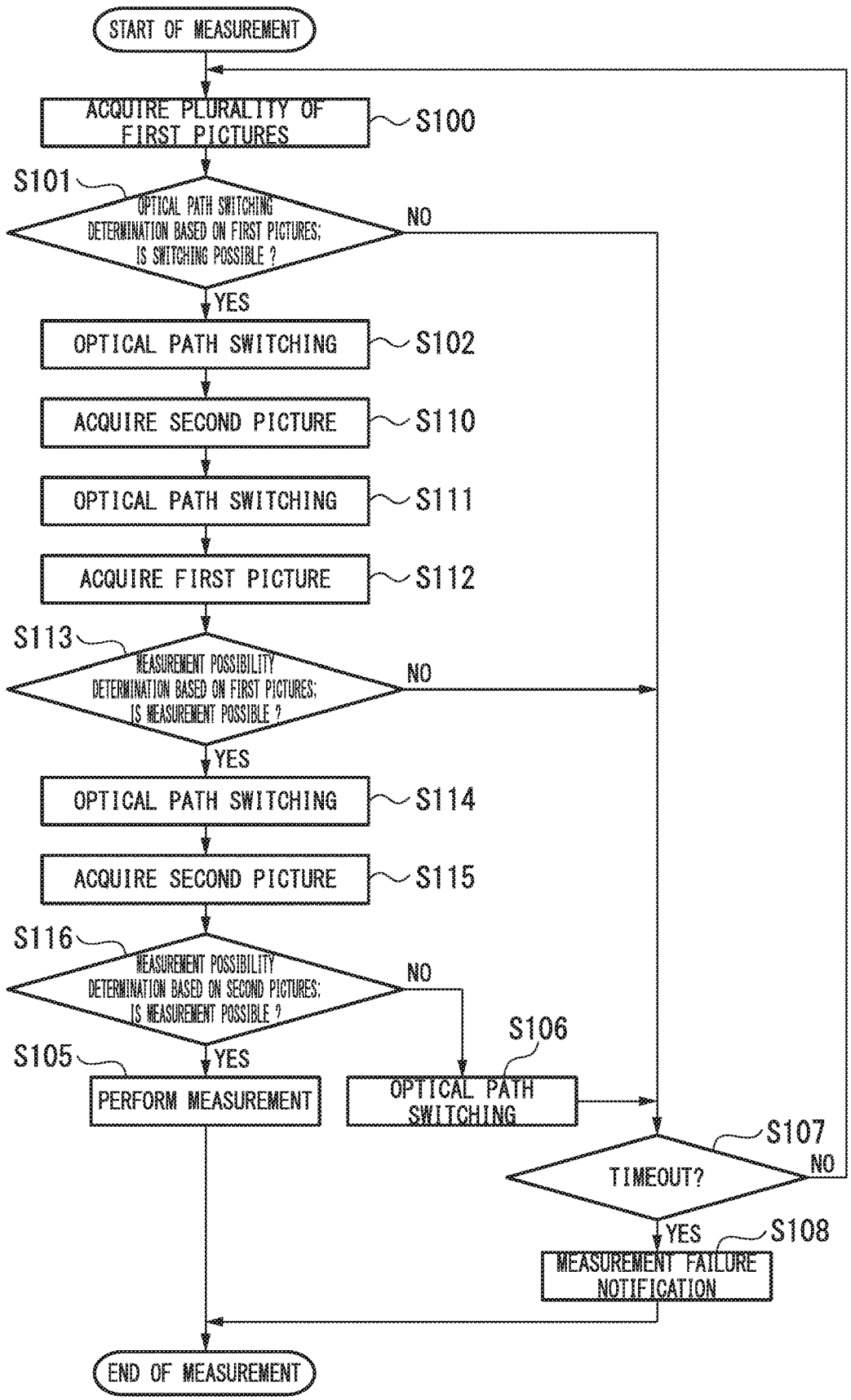
FIG. 4 is a flowchart showing a measurement procedure in a second embodiment of the present invention.

FIG. 4 shows a measurement procedure in the second embodiment. Details of measurement in the second embodiment will be described below with reference to FIG. 4. The procedure shown in FIG. 4 will be described in terms of differences from the procedure shown in FIG. 2.

After step S102, the controller 107 instructs the image sensor 104 to capture one second picture. The image sensor 104 captures a second image once and generates one second picture based on the second image. The image sensor 104 outputs the second picture to the controller 107. The controller 107 stores the second picture output from the image sensor 104 in the frame memory 106. The controller 107 also outputs a first picture acquired last among a plurality of first pictures acquired in step S100 to the display unit 6. The display unit 6 displays the first picture (step S110).

After step S110, the controller 107 instructs the optical path setting unit 102 to perform optical path switching to set the first optical path L1. Thus, the light shielding plate is removed from the first optical path L1 and then inserted into the second optical path L2. A first image of the subject based on light transmitted through the first optical system 100 is formed on the imaging area 104a of the image sensor 104 (step S111).

After step S111, the controller 107 instructs the image sensor 104 to capture one first picture. The image sensor 104 captures a first image once and generates one first picture based on the first image. The image sensor 104 outputs the first picture to the controller 107. The controller 107 stores the first picture output from the image sensor 104 in the frame memory 106. The controller 107 also outputs the first picture to the display unit 6. The display unit 6 displays the first picture (step S112).

After step S112, the controller 107 performs blurring detection on the basis of at least two first pictures among the plurality of first pictures stored in the frame memory 106. The at least two first pictures include the first picture acquired in step S100 and the first picture acquired in step S112. The method of blurring detection is similar to that of step S101. The controller 107 compares the amount of blurring calculated from the first pictures with a predetermined threshold value to determine whether or not there is blurring. This allows the controller 107 to determine whether or not it is possible to perform measurement (step S113).

When the amount of blurring between the first pictures is smaller than the threshold value, the controller 107 determines that there is no blurring. In this case, the controller 107 determines that it is possible to perform measurement. When the amount of blurring between the first pictures is greater than the threshold value, the controller 107 determines that there is blurring. In this case, the controller 107 determines that it is not possible to perform measurement.

When the controller 107 determines in step S113 that there is blurring, that is, that it is not possible to perform measurement, the process of step S107 is performed. When the controller 107 determines in step S113 that there is no blurring, that is, that it is possible to perform measurement, the controller 107 instructs the optical path setting unit 102 to perform optical path switching to set the second optical path L2. Thus, the light shielding plate on the second optical path L2 is removed from the second optical path L2 and then inserted into the first optical path L1. A second image of the subject based on light transmitted through the second optical system 101 is formed on the imaging area 104a of the image sensor 104 (step S114).

After step S114, a second picture is acquired by the same process as that of step S110. The controller 107 outputs the first picture acquired in step S112 to the display unit 6. The display unit 6 displays the first picture (step S115).

After step S115, the controller 107 performs blurring detection on the basis of the two second pictures stored in the frame memory 106 in steps S110 and S115. The method of blurring detection is similar to that of step S101. The controller 107 compares the amount of blurring calculated from the second pictures with a predetermined threshold value to determine whether or not there is blurring. This allows the controller 107 to determine whether or not it is possible to perform measurement (step S116). The determination method in step S116 is similar to that of step S104 shown in FIG. 2.

When the controller 107 determines in step S116 that there is no blurring, that is, that it is possible to perform measurement, the process of step S105 is performed. The first picture used for the determination in step S113 and the second picture used for the determination in step S116 are used for the measurement in step S105. When the controller 107 determines in step S116 that there is blurring, that is, that it is not possible to perform measurement, the process of step S106 is performed.

Regarding points other than the above, the procedure shown in FIG. 4 is similar to that shown in FIG. 2.

In the measurement of the second embodiment, the controller 107 performs the optical path setting control to cause the optical path setting unit 102 to alternately set the first optical path L1 and the second optical path L2 (steps S111 and S114). When the second optical path L2 is set before the first optical path L1 is set, the controller 107 performs the second picture generation control to cause the image sensor 104 to generate a first group (step S110). The first group includes a plurality of second pictures. When the first optical path L1 is set after the second optical path L2 is set, the controller 107 performs the first picture generation control to cause the image sensor 104 to generate the first picture (step S112). When the second optical path L2 is set after the first optical path L1 is set, the controller 107 performs the second picture generation control to cause the image sensor 104 to generate a second group (step S115). The second group includes a plurality of second pictures. By performing the second picture blurring determination, the controller 107 determines whether or not there is blurring on the basis of at least one second picture included in the first group and at least one second picture included in the second group (step S116).

Figure 5:
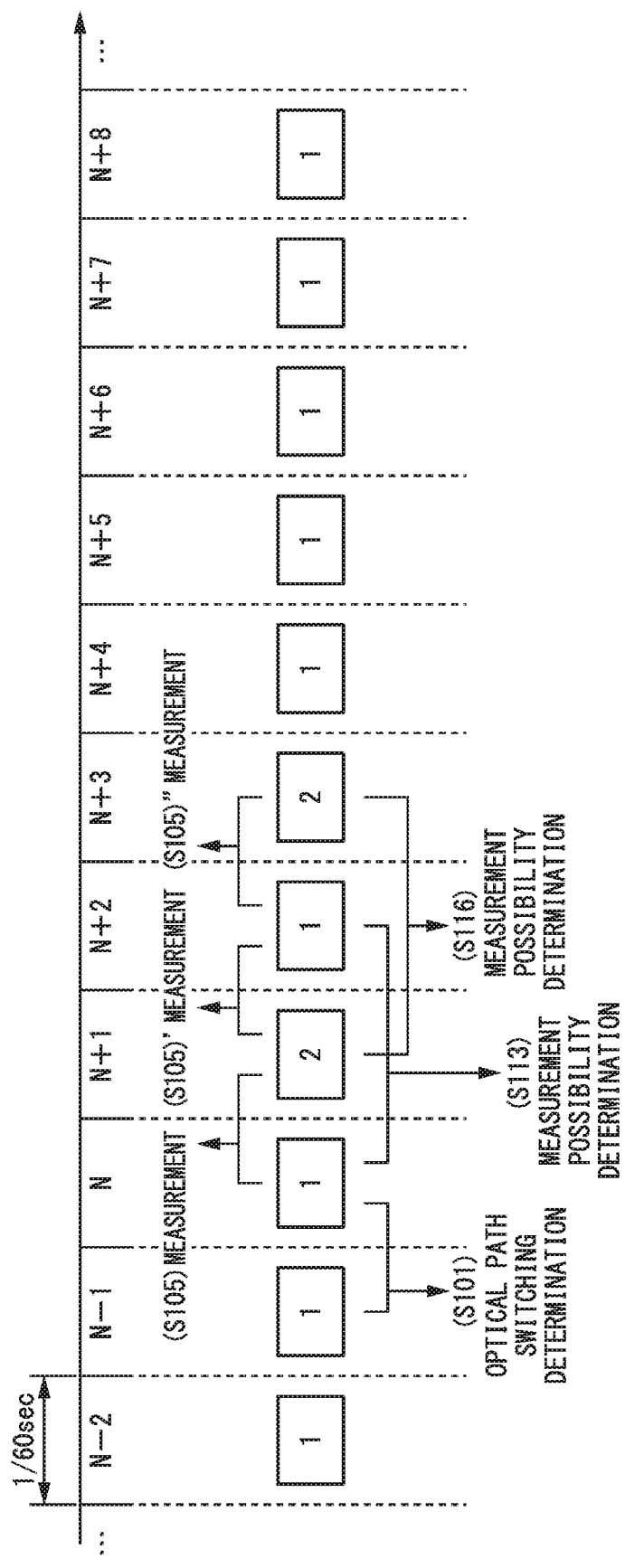
FIG. 5 is a timing chart showing a picture acquisition sequence in the second embodiment of the present invention.

FIG. 5 shows a picture acquisition sequence. Time advances to the right in FIG. 5. Pictures acquired from N−2th to N+8th frames are shown in FIG. 5. "1" shown in FIG. 5 represents first pictures and "2" represents second pictures.

First pictures are acquired from N−2th to Nth frames in a state in which the optical path for imaging is set to the first optical path L1 (step S100). The controller 107 performs blurring detection on the basis of the two first pictures of the N−1th and Nth frames and determines whether or not optical path switching is possible (step S101). When the controller 107 determines that optical path switching is possible, the optical path for imaging is switched from the first optical path L1 to the second optical path L2 (step S102).

A second picture is acquired in the N+1th frame (step S110). Thereafter, the optical path for imaging is switched from the second optical path L2 to the first optical path L1 (step S111). A first picture is acquired in the N+2th frame (step S112). The controller 107 performs blurring detection on the basis of the two first pictures of the Nth and N+2th frames and determines whether or not it is possible to perform measurement (step S113). When the controller 107 determines that it is possible to perform measurement, the optical path for imaging is switched from the first optical path L1 to the second optical path L2 (step S114).

A second picture is acquired in the N+3th frame (step S115). The controller 107 performs blurring detection on the basis of the two second pictures of the N+1th and N+3th frames and determines whether or not it is possible to perform measurement (step S116). When the controller 107 determines that it is possible to perform measurement, the measurement unit 105 performs measurement on the basis of the first picture of the Nth frame and the second picture of the N+1th frame (step S105). FIG. 5 shows how the optical path for imaging is again set to the first optical path L1 and first pictures of the N+4th and subsequent frames are acquired.

A combination of pictures used for measurement is not limited to those described above. Any one of the first pictures acquired in a state without blurring may be used for measurement. Therefore, instead of the first picture of the Nth frame, the first picture of the N−1th or N+2th frame may be used for measurement. Any one of the second pictures acquired in a state without blurring may also be used for measurement. Therefore, instead of the second picture of the N+1th frame, the second picture of the N+3th frame may be used for measurement. As shown in FIG. 5, the measurement unit 105 may perform measurement on the basis of the first picture of the N+2th frame and the second picture of the N+1th frame. Alternatively, the measurement unit 105 may perform measurement on the basis of the first picture of the N+2th frame and the second picture of the N+3th frame. The measurement unit 105 may perform measurement on a plurality of combinations of first and second pictures and statistically process a plurality of measurement results to acquire a measurement value. The measurement value may be, for example, an average of the plurality of measurement results.

In addition to the determination in steps S113 and S116, the controller 107 may determine whether or not it is possible to perform measurement by determining whether or not there is blurring on the basis of two first pictures before and after the second pictures are acquired. That is, the controller 107 performs the determination using the first picture of the Nth frame and the first picture of the N+4th frame. When the controller 107 determines that it is possible to perform measurement in each of the determination of steps S113 and S116 and the determination based on the first pictures of the Nth frame and the N+4th frame, measurement is performed.

As described above, measurement is performed when there is no blurring between the first pictures in steps S101 and S113 and there is no blurring between the second pictures in step S116. This avoids the execution of measurement when great blurring has occurred at the timing of capturing second pictures although the amount of blurring between first pictures is small. This allows the measurement device 1 to suppress degradation of measurement accuracy and to avoid the risk of providing measurement results including errors to the user. As a result, the measurement device 1 can perform more reliable measurement.

Second pictures are acquired only in non-consecutive frames. In a frame in which a second picture is acquired, a first picture acquired immediately before the frame is displayed again. This shortens the period during which first pictures are not updated on the display unit 6. In particular, when blurring has occurred in a first picture, first pictures are frequently updated on the display unit 6 to allow the user to easily grasp the situation.

Third Embodiment

A third embodiment of the present invention will be described using the measurement device 1 shown in FIG. 1.

Figure 6:
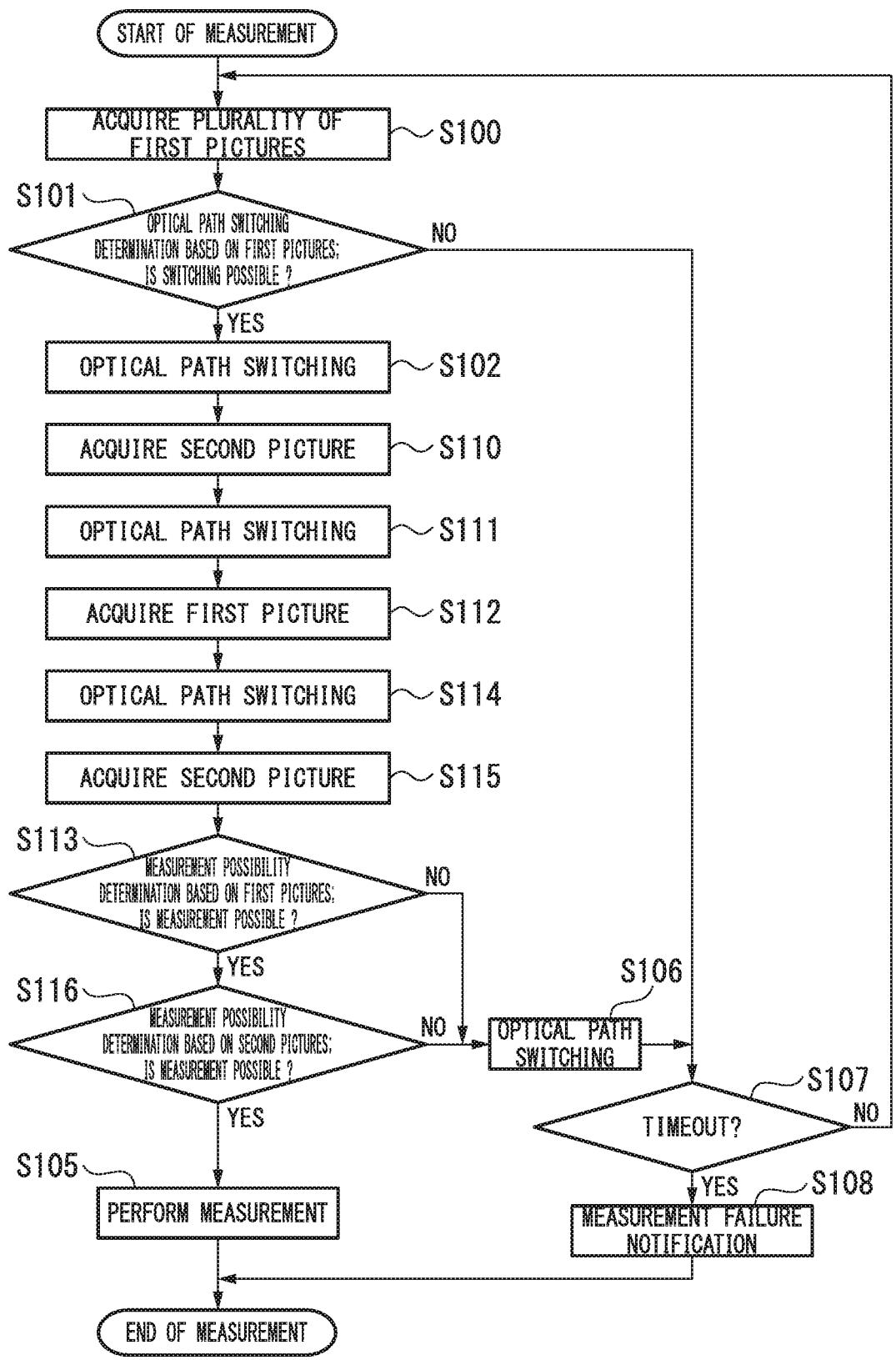
FIG. 6 is a flowchart showing a measurement procedure in a third embodiment of the present invention.

FIG. 6 shows a measurement procedure in the third embodiment. Details of measurement in the third embodiment will be described below with reference to FIG. 6. The procedure shown in FIG. 6 will be described in terms of differences from the procedure shown in FIG. 4.

In the measurement shown in FIG. 4 and the measurement shown in FIG. 6, the process of step S113 is performed at different timings. As shown in FIG. 6, the process of step S114 is performed after step S112. That is, after a first picture is acquired in step S112, the determination of the amount of blurring of the first picture is not performed and the second optical path L2 is set in step S114. Then, the process of step S113 is performed after step S115.

When the controller 107 determines in step S113 that there is no blurring, that is, that it is possible to perform measurement, the process of step S116 is performed. When the controller 107 determines in step S113 that there is blurring, that is, that it is not possible to perform measurement, the process of step S106 is performed.

It is to be noted that the timing at which the process of step S106 is performed may be different from that shown in FIG. 6. For example, the process of step S106 may be performed after step S115. In this case, the display unit 6 can display a first picture as a live image acquired in real time, i.e., as a moving image, rather than as a still image acquired by the process of step S112. In addition, such continuous display of a live image during the determination process gives a very great benefit to the user since it is conceivable that the processing time required for the determination process in steps S113 and S116 is long.

Regarding points other than the above, the procedure shown in FIG. 6 is similar to that shown in FIG. 4.

In the measurement of the third embodiment, the first picture blurring determination (step S113) and the second picture blurring determination (step S116) are performed after the first picture generation control (steps S100 and S112) and the second picture generation control (steps S110 and S115).

The picture acquisition sequence in the third embodiment is similar to that shown in FIG. 5.

As described above, measurement is performed when there is no blurring between the first pictures in steps S101 and S113 and there is no blurring between the second pictures in step S116. This avoids the execution of measurement when great blurring has occurred at the timing of capturing second pictures although the amount of blurring between first pictures is small. Thus, the measurement device 1 can suppress degradation of measurement accuracy and avoid the risk of providing measurement results including errors to the user. As a result, the measurement device 1 can perform more reliable measurement.

In the second embodiment, a blurring determination process (step S113) is performed in the middle of a sequence of acquiring first and second pictures including optical path switching. A process of template matching between a plurality of pictures and the like are performed in the blurring determination process. Therefore, there are cases in which a computation cost, that is, a processing time, is required and there is a possibility that a series of picture acquisition sequences are stuck. However, in this third embodiment, the blurring determination processes of steps S113 and S116 are performed after the sequence of acquiring first and second pictures including optical path switching ends. This avoids the delay of the picture acquisition sequence. Therefore, the measurement device 1 can perform more reliable measurement.

Fourth Embodiment

A fourth embodiment of the present invention will be described using the measurement device 1 shown in FIG. 1.

Figure 7:
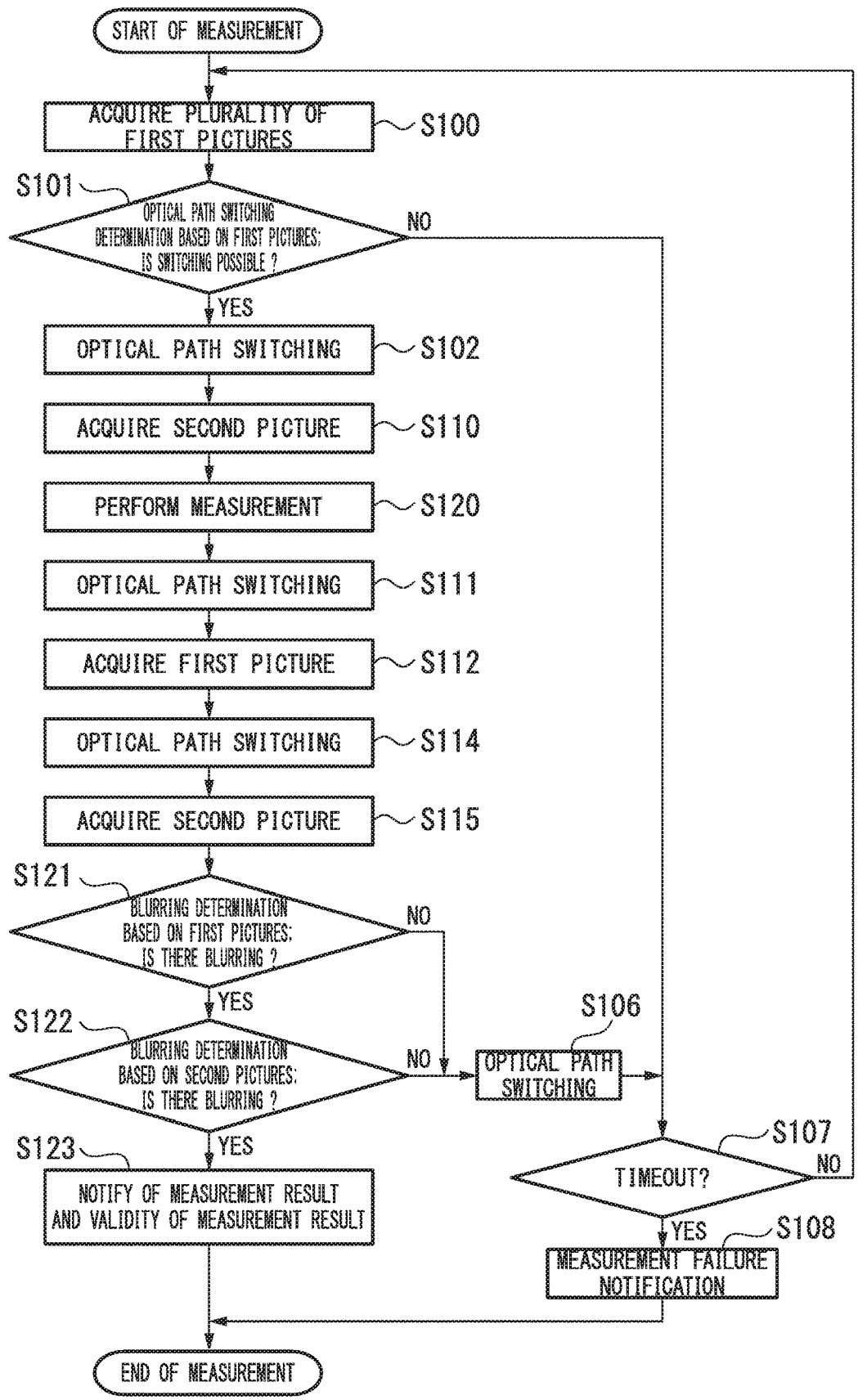
FIG. 7 is a flowchart showing a measurement procedure in a fourth embodiment of the present invention.

FIG. 7 shows a measurement procedure in the fourth embodiment. Details of measurement in the fourth embodiment will be described below with reference to FIG. 7. The procedure shown in FIG. 7 will be described in terms of differences from the procedure shown in FIG. 6.

After step S110, the controller 107 instructs the measurement unit 105 to perform measurement. The measurement unit 105 performs measurement on the basis of the first and second pictures stored in the frame memory 106. The first picture used for the determination in step S101 and the second picture acquired in step S110 are used for measurement. The measurement unit 105 notifies the controller 107 of the measurement result (step S120). After step S120, the process of step S111 is performed.

After step S115, the controller 107 performs blurring detection on the basis of at least two first pictures among the plurality of first pictures stored in the frame memory 106. The at least two first pictures include the first picture acquired in step S100 and the first picture acquired in step S112. The method of blurring detection is similar to that of step S101. The controller 107 compares the amount of blurring calculated from the first pictures with a predetermined threshold value to determine whether or not there is blurring (step S121).

When the amount of blurring between the first pictures is smaller than the threshold value, the controller 107 determines that there is no blurring. When the amount of blurring between the first pictures is greater than the threshold value, the controller 107 determines that there is blurring.

When the controller 107 determines in step S121 that there is blurring, the process of step S107 is performed.

When the controller 107 determines in step S121 that there is no blurring, the controller 107 performs blurring detection on the basis of the two second pictures stored in the frame memory 106 in steps S110 and S115. The method of blurring detection is similar to that of step S101. The controller 107 compares the amount of blurring calculated from the second pictures with a predetermined threshold value to determine whether or not there is blurring (step S122).

When the amount of blurring between the second pictures is smaller than the threshold value, the controller 107 determines that there is no blurring. When the amount of blurring between the second pictures is greater than the threshold value, the controller 107 determines that there is blurring.

When the controller 107 determines in step S122 that there is no blurring, the controller 107 determines that the measurement result obtained in step S120 is valid. The measurement result being valid is equivalent to the reliability of the measurement result being high. The controller 107 outputs a message indicating that the measurement result is valid together with the measurement result to the display unit 6. The display unit 6 displays the measurement result and the message. Thus, the controller 107 and the display unit 6 notify the user that the measurement result is valid (step S123). When the process of step S123 is performed, the measurement is terminated. At this time, the first and second pictures used for measurement in step S120 and the measurement result may be recorded on the recording medium 7. Information indicating that the measurement result is valid may be added to the measurement result and the measurement result may be recorded on the recording medium 7.

When the controller 107 determines in step S122 that there is blurring, the controller 107 determines that the measurement result obtained in step S120 is invalid. In this case, the process of step S107 is performed. Also, the measurement result obtained in step S120 is discarded. The measurement result being invalid is equivalent to the reliability of the measurement result being low.

The timing at which the process of step S106 is performed may be different from that shown in FIG. 7. After step S115, the process of step S121 may be performed without optical path switching. When the controller 107 determines in step S121 or step S122 that the measurement result is invalid, the process of step S106 may be performed.

Regarding points other than the above, the procedure shown in FIG. 7 is similar to that shown in FIG. 6.

In the measurement of the fourth embodiment, the controller 107 performs the optical path setting control, the first picture generation control, the second picture generation control, the measurement control, the first picture blurring determination, the second picture blurring determination, and the validity determination. The optical path setting control, the first picture generation control, and the second picture generation control are similar to those of the first embodiment. By performing the measurement control, the controller 107 causes the measurement unit 105 to perform measurement based on both at least one of the plurality of first pictures generated by the first picture generation control and at least one of the plurality of second pictures generated by the second picture generation control (step S120). By performing the first picture blurring determination, the controller 107 determines whether or not there is blurring on the basis of both the first picture used in the measurement control and the first picture other than the first picture used in the measurement control among the plurality of first pictures generated by the first picture generation control (step S121). By performing the second picture blurring determination, the controller 107 determines whether or not there is blurring on the basis of both the second picture used in the measurement control and the second picture other than the second picture used in the measurement control among the plurality of second pictures generated by the second picture generation control (step S122). When the controller 107 determines that there is no blurring in the first picture blurring determination and the second picture blurring determination, the controller 107 performs the validity determination to determine that a measurement result obtained through the measurement performed by the measurement unit 105 is valid (step S123).

Figure 8:
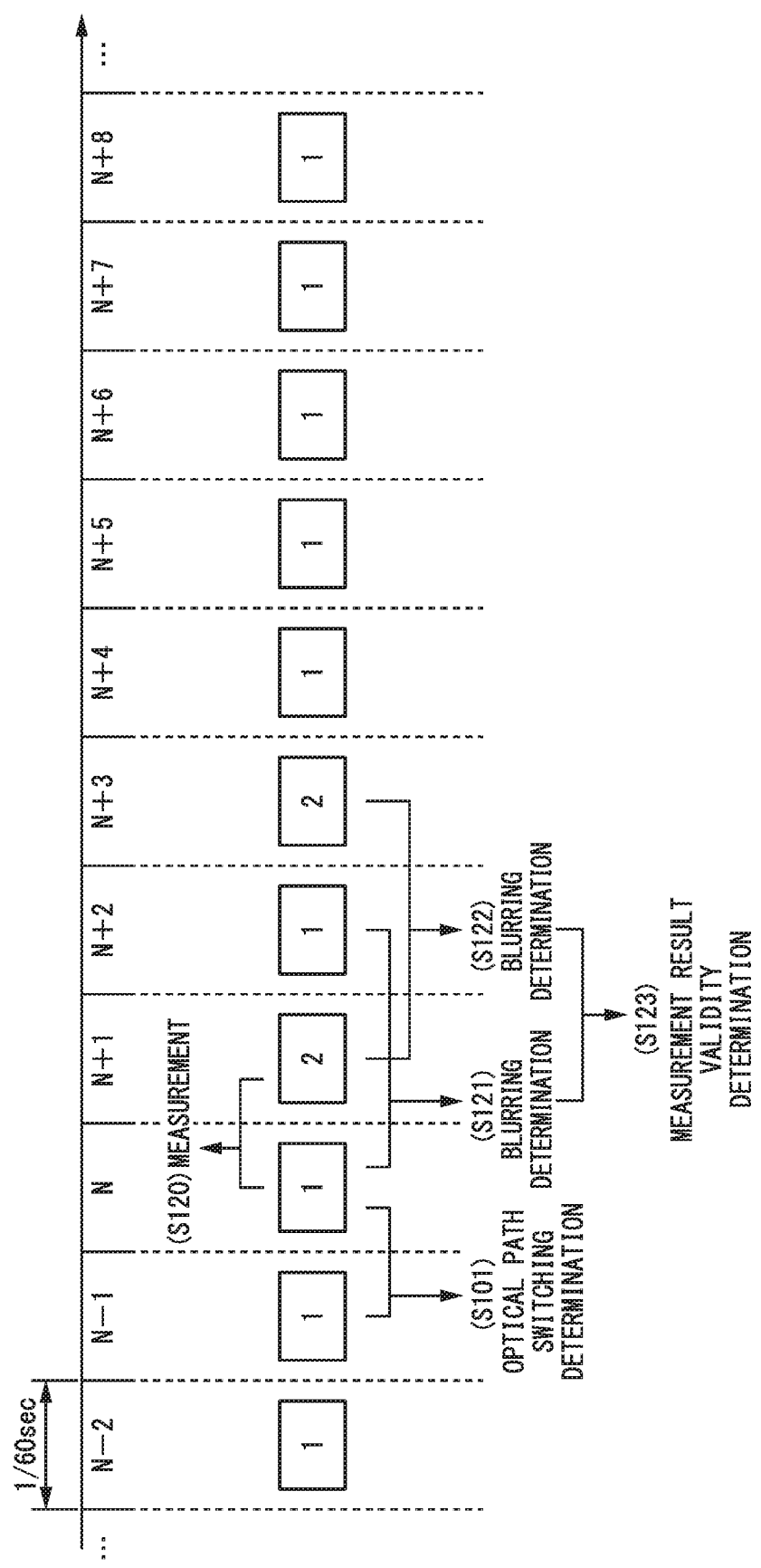
FIG. 8 is a timing chart showing a picture acquisition sequence in the fourth embodiment of the present invention.
Figure 9A:
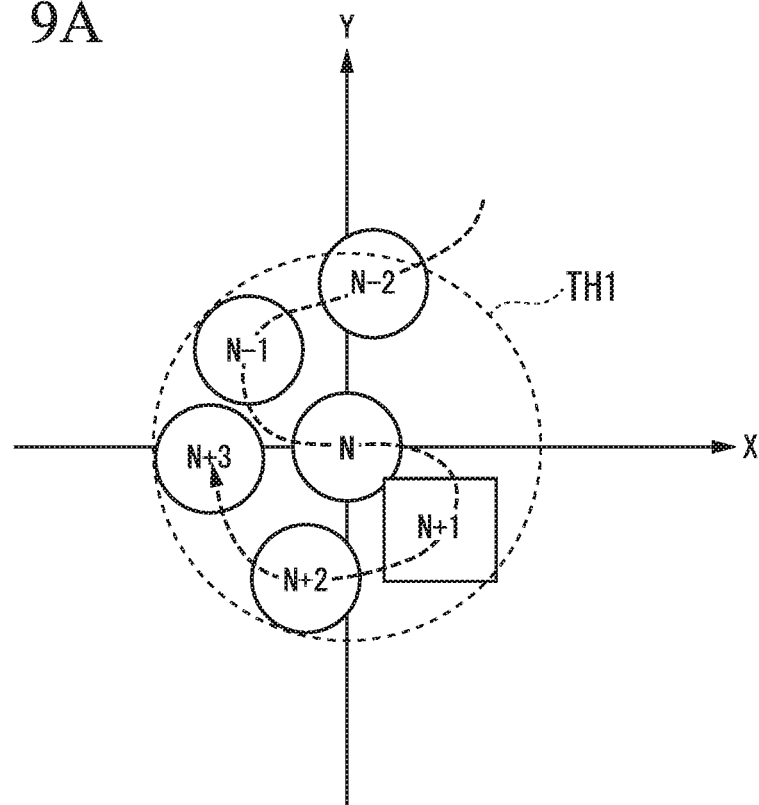
FIG. 9A is a schematic diagram showing the amount of blurring at the timing of capturing a picture.
Figure 9B:
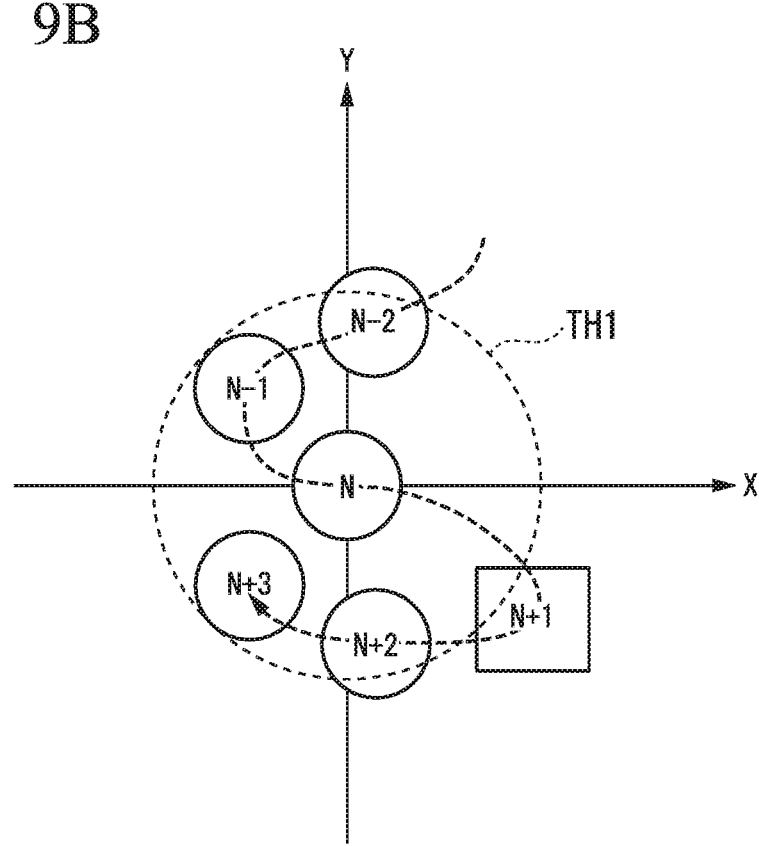
FIG. 9B is a schematic diagram showing the amount of blurring at the timing of capturing a picture.

FIG. 8 shows a picture acquisition sequence. Time advances to the right in FIG. 8. Pictures acquired from N−2th to N+8th frames are shown in FIG. 8. "1" shown in FIG. 8 represents first pictures and "2" represents second pictures.

First pictures are acquired from N−2th to Nth frames in a state in which the optical path for imaging is set to the first optical path L1 (step S100). The controller 107 performs blurring detection on the basis of the two first pictures of the N−1th and Nth frames and determines whether or not optical path switching is possible (step S101). When the controller 107 determines that optical path switching is possible, the optical path for imaging is switched from the first optical path L1 to the second optical path L2 (step S102).

A second picture is acquired in the N+1th frame (step S110). The measurement unit 105 performs measurement on the basis of the first picture of the Nth frame and the second picture of the N+1th frame (step S120). Thereafter, the optical path for imaging is switched from the second optical path L2 to the first optical path L1 (step S111). A first picture is acquired in the N+2th frame (step S112). Thereafter, the optical path for imaging is switched from the first optical path L1 to the second optical path L2 (step S114).

A second picture is acquired in the N+3th frame (step S115). Thereafter, the controller 107 performs blurring detection on the basis of the two first pictures of the Nth frame used for the measurement and N+2th frame and determines whether or not there is blurring (step S121). Further, the controller 107 performs blurring detection on the basis of the two second pictures of the N+1th frame used for the measurement and N+3th frame and determines whether or not there is blurring (step S122). When the controller 107 determines in steps S121 and S122 that there is no blurring, the controller 107 determines that the measurement result is valid (step S123). FIG. 8 shows how the optical path for imaging is again set to the first optical path L1 and first pictures of the N+4th and subsequent frames are acquired.

A combination of pictures used for measurement is not limited to those described above. Any one of the first pictures acquired in a state without blurring may be used. Therefore, the first picture of the N−1th or N+2th frame may be used instead of the first picture of the Nth frame.

As described above, in steps S121 and S122, whether or not there is blurring is determined after measurement is performed. Further, in step S123, whether or not the measurement result is valid is determined on the basis of the blurring determination result. Thus, when great blurring has occurred at the timing of capturing second pictures although the amount of blurring between first pictures is small, it is determined that the measurement result is invalid. This allows the measurement device 1 to suppress degradation of measurement accuracy and to avoid the risk of providing measurement results including errors to the user. As a result, the measurement device 1 can perform more reliable measurement.

(Additional Statement)

According to one aspect of the present invention, a measurement device includes an imaging unit, an optical path setting unit, a measurement unit, and a controller. The imaging unit includes an imaging area on which a first image of a subject formed by light transmitted through a first optical path and a second image of the subject formed by light transmitted through a second optical path different from the first optical path are commonly formed. The imaging unit is configured to capture the first and second images and to generate a first picture based on the first image and a second picture based on the second image. The optical path setting unit is configured to set one of the first and second optical paths as an optical path for imaging such that only one of the first and second images is formed on the imaging area. The measurement unit is configured to measure at least one of a shape of the subject and a distance to the subject on the basis of the first and second pictures. The controller is configured to control the imaging unit, the optical path setting unit, and the measurement unit. The controller is configured to perform optical path setting control to cause the optical path setting unit to set one of the first optical path and the second optical path as the optical path for imaging. The controller is configured to perform first picture generation control to cause the imaging unit to capture the first image in a state in which the first optical path is set as the optical path for imaging and to generate a plurality of first pictures based on the first image. The controller is configured to perform second picture generation control to cause the imaging unit to capture the second image in a state in which the second optical path is set as the optical path for imaging and to generate a plurality of second pictures based on the second image. The controller is configured to perform measurement control to cause the measurement unit to perform measurement of at least one of the shape and the distance on the basis of both at least one first picture among the plurality of first pictures and at least one second picture among the plurality of second pictures. The controller is configured to perform first picture blurring determination to determine whether or not there is blurring on the basis of both the first picture used in the measurement control and the first picture other than the first picture used in the measurement control among the plurality of first pictures. The controller is configured to perform second picture blurring determination to determine whether or not there is blurring on the basis of both the second picture used in the measurement control and the second picture other than the second picture used in the measurement control among the plurality of second pictures. The controller is configured to perform validity determination to determine that a measurement result obtained through the measurement performed by the measurement unit is valid when the controller determines that there is no blurring in the first picture blurring determination and the second picture blurring determination.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A measurement device comprising:
an image sensor including an imaging area on which a first image of a subject formed by light transmitted through a first optical path and a second image of the subject formed by light transmitted through a second optical path different from the first optical path are commonly formed, the image sensor being configured to capture the first and second images and to generate a first picture based on the first image and a second picture based on the second image;
an optical switch configured to set one of the first and second optical paths as an optical path for imaging such that only one of the first and second images is formed on the imaging area; and
a controller configured to:
control the image sensor and the optical switch and to measure at least one of a shape of the subject and a distance to the subject on the basis of the first and second pictures,
control the optical switch to alternately set one of the first optical path and the second optical path as the optical path for imaging,
control the image sensor to capture the first image in a state in which the first optical path is set as the optical path for imaging and to generate a plurality of first pictures based on the first image,
control the image sensor to capture the second image in a state in which the second optical path is set as the optical path for imaging and to generate a plurality of second pictures based on the second image,
when the second optical path is set before the first optical path is set, control the image sensor to generate a first group including at least one of the plurality of second pictures,
when the first optical path is set after the second optical path is set, control the image sensor to generate the first picture,
when the second optical path is set after the first picture and the first group is generated, control the image sensor to generate a second group including at least one of the plurality of second pictures,
determine whether or not there is first picture blurring on the basis of at least two of the plurality of first pictures,
determine whether or not there is second picture blurring on the basis of at least one of the plurality of second pictures included in the first group and at least one of the plurality of second pictures included in the second group, and
measure at least one of the shape and the distance when the controller determines that there is no first picture blurring and no second picture blurring; wherein:
in determining whether or not there is first picture blurring, at least one of the at least two of the plurality of first pictures is generated before the first group and an other of the at least two of the plurality of first pictures is generated after the first group; and
in determining whether or not there is second picture blurring, at least one of the plurality of first pictures is generated between the at least one of the plurality of second pictures included in the first group and the at least one of the plurality of second pictures included in the second group.

2. The measurement device according to claim 1,
wherein, when the controller is configured to control the optical switch to set the first optical path and then to set the second optical path,
the controller controls the image sensor to generate a plurality of consecutive second pictures after the second optical path is set, and
the controller determines whether or not there is the second picture blurring on the basis of two or more consecutive second pictures among the plurality of consecutive second pictures.

3. The measurement device according to claim 1, wherein the controller determines the first picture blurring and the second picture blurring after generation of the plurality of first images and the generation of the plurality of second images.

4. A method for operating a measurement device,
wherein the measurement device comprising including:
an image sensor including an imaging area on which a first image of a subject formed by light transmitted through a first optical path and a second image of the subject formed by light transmitted through a second optical path different from the first optical path are commonly formed, the image sensor being configured to capture the first and second images and to generate a first picture based on the first image and a second picture based on the second image; and
an optical switch configured to set one of the first and second optical paths as an optical path for imaging such that only one of the first and second images is formed on the imaging area;
the method comprising:
controlling the optical switch to set one of the first optical path and the second optical path,
before the first optical path is set, controlling the image sensor to capture the second image in a state in which the second optical path is set as the optical path for imaging and to generate a first group including at least one of a plurality of second pictures based on the second image,
after the second optical path is set, controlling the image sensor to capture the first image in a state in which the first optical path is set as the optical path for imaging and to generate a plurality of first pictures based on the first image,
after the first picture and the first group are generated, controlling the imager sensor to capture the second image in a state in which the second optical path is set as the optical path for imaging and to generate a second group indicating at least one of the plurality of second pictures based on the second image,
determining whether or not there is first picture blurring on the basis of at least two of the plurality of first pictures,
determining whether or not there is second picture blurring on the basis of at least one of the second pictures included in the first group and at least one of the second pictures included in the second group, and
measuring at least one of a shape of the subject and a distance to the subject when it is determined that there is no first picture blurring and no second picture blurring; wherein:
in determining whether or not there is first picture blurring, at least one of the at least two of the plurality of first pictures is generated before the first group and an other of the at least two of the plurality of first pictures is generated after the first group; and
in determining whether or not there is second picture blurring, at least one of the plurality of first pictures is generated between the at least one of the plurality of second pictures included in the first group and the at least one of the plurality of second pictures included in the second group.

5. A method for operating a measurement device,
wherein the measurement device comprising:
an image sensor including an imaging area on which a first image of a subject formed by light transmitted through a first optical path and a second image of the subject formed by light transmitted through a second optical path different from the first optical path are commonly formed, the image sensor being configured to capture the first and second images and to generate a first picture based on the first image formed on the imaging area and a second picture based on the second image formed on the imaging area;
an optical switch configured to set one of the first and second optical paths as an optical path for imaging such that only one of the first and second images is formed on the imaging area; and
the method comprising:
controlling the optical switch to set one of the first optical path and the second optical path,
before the first optical path is set, controlling the image sensor to capture the second image in a state in which the second optical path is set as the optical path for imaging and to generate a first group including at least one of a plurality of second pictures based on the second image,
after the second optical path is set, controlling the image sensor to capture the first image in a state in which the first optical path is set as the optical path for imaging and to generate a plurality of first pictures based on the first image,
after the first pictures and the first are is generated, controlling the image sensor to capture the second image in a state in which the second optical path is set as the optical path for imaging and to generate a second group including at least one of the plurality of second picture based on the second image,
measuring at least one of a shape of the subject and a distance to the subject on the basis of at least one first picture among the plurality of first pictures and at least one second picture among the plurality of second pictures,
determining whether or not there is first picture blurring on the basis of the at least one first picture used in the measuring and a first picture other than the at least one first picture used in the measuring among the plurality of first pictures,
determining whether or not there is second picture blurring on the basis of:
at least one of the second pictures included in the first group and used in the measuring and at least one of the second pictures included in the second group; or
at least one of the second pictures included in the second group and used in the measuring and at least one of the second pictures included in the first group, and
determining whether a measurement result obtained through the measuring is valid when it is determined that there is no first picture blurring and no second picture blurring; wherein:

in determining whether or not there is first picture blurring, the at least one first picture used in the measuring is generated before the first group and the first picture other than the at least one first picture used in the measuring is generated after the first group; and in determining whether or not there is second picture blurring the at least one of the plurality of plurality of first pictures is generated between:
- the at least one of the second pictures included in the first group and used in the measuring and the at least one of the plurality of second pictures included in the second group; or
- the at least one of the second pictures included in the second group and used in the measuring and the at least one of the second pictures included in the first group.

* * * * *